United States Patent

Driskill

[15] 3,662,975

[45] May 16, 1972

[54] AUXILIARY ELECTRICAL GENERATING SYSTEM FOR JET AIRCRAFT

[72] Inventor: Robert E. Driskill, 4702 Highland Terrace, Humble, Tex. 78731

[22] Filed: Sept. 21, 1970

[21] Appl. No.: 73,968

[52] U.S. Cl. ................................................244/58
[51] Int. Cl. ..............................................B64d 41/00
[58] Field of Search........................................244/58

[56] References Cited

UNITED STATES PATENTS 2,622,390  12/1952  Newton...................................244/58
2,706,255  4/1955  Breaux et al............................244/58

*Primary Examiner*—Milton Buchler
*Assistant Examiner*—Carl A. Rutledge
*Attorney*—J. Vincent Martin, Joe E. Edwards, M. H. Gay, Alfred H. Evans and Jack R. Springgate

[57] ABSTRACT

An auxiliary electrical generating system for jet aircraft wherein compressed air is withdrawn from a jet engine and used to operate a pneumatic turbine which in turn drives a generator. An ancillary gas source may be included for supplying compressed gas to the turbine in the event of engine failure. This abstract is neither intended to define the invention of the application which, of course, is measured by the claims, nor is it intended to be limiting as to scope of the invention in any way.

3 Claims, 1 Drawing Figure

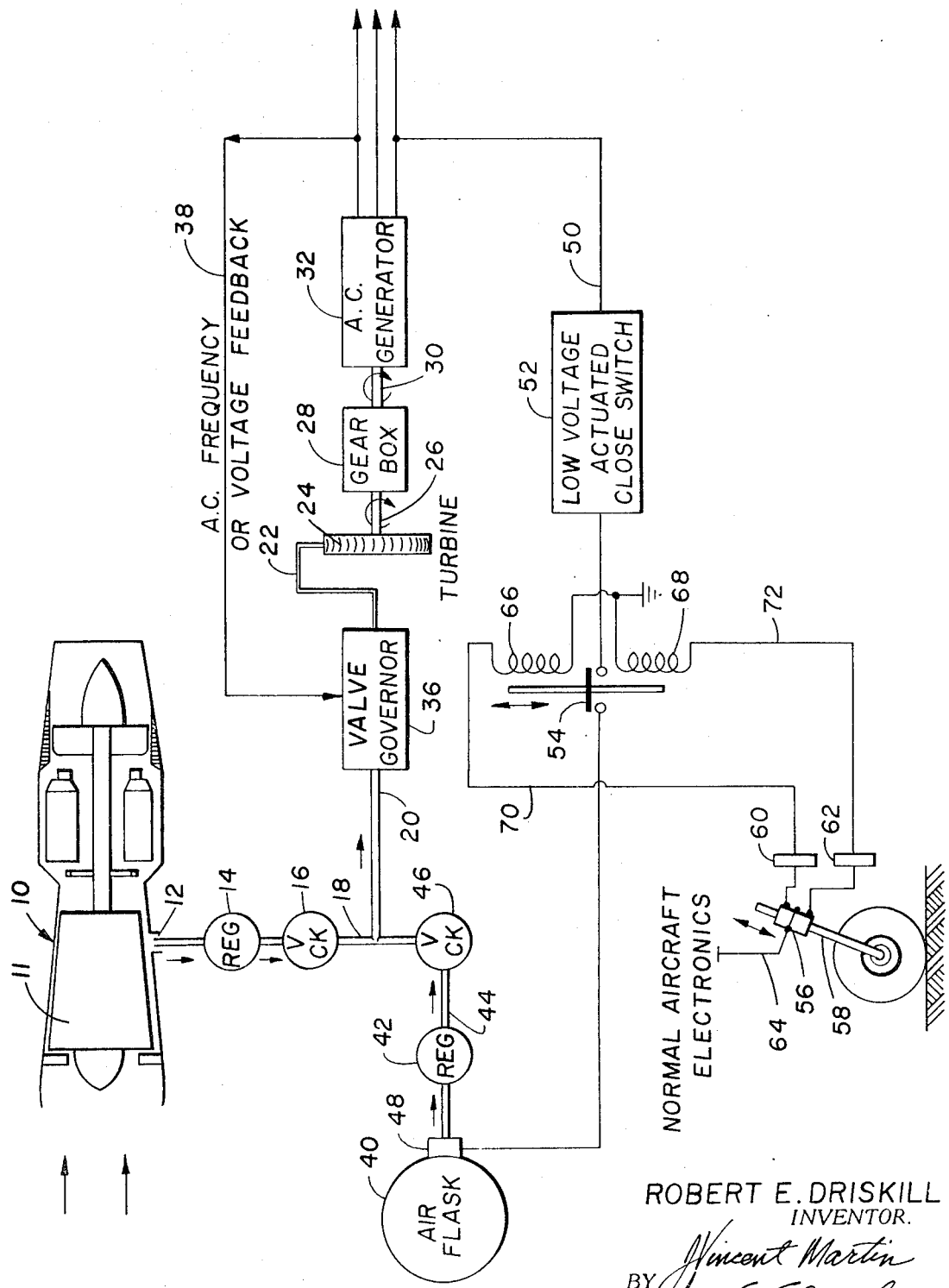

AUXILIARY ELECTRICAL GENERATING SYSTEM FOR JET AIRCRAFT

This invention relates to electrical generating systems, and particularly to auxiliary electrical generating systems for use aboard jet aircraft. Large jet aircraft contain numerous electrically powered instruments and other appliances. Some of these instruments, such as the gyroscopic attitude indicators, are of critical importance to the pilot when the aircraft is operating at night, in heavy moisture or under other conditions which make visual references impossible. It is, therefore, highly desirable that means be provided for the continued operation of these instruments and their illumination in emergency situations, such as a total failure of the aircraft's normal electrical generating system.

The reliable operation of a gyroscopic attitude indicator under all conditions is considered so important that the Federal Aviation Agency has recently promulgated a new Federal Air Regulation No. 121.305(j), effective Aug. 5, 1971, which requires that all large jet aircraft have, in addition to their two normal attitude gyros, a third such instrument that is powered from a source independent of the aircraft's normal electrical system, that operates independently of any other systems and appliances and that will continue reliable operation for a minimum of 30 minutes after total failure of the aircraft's normal electrical system. It is an object of the present invention to provide an auxiliary electrical generating system suitable for illuminating and powering a gyroscopic attitude indicator in compliance with FAR 121.305(j).

Another object is to provide an auxiliary electrical generating system which may be used to supply power to critical instruments and which will operate wholly independently of the aircraft's normal electrical system.

Another object is to provide such a system which will operate at all times that one or more of the jet engines are operating.

A further object is to provide such a system which includes an ancillary power source which will serve to keep the system operating for a limited period of time, even after failure of all jet engines.

These and other objects and advantages of the invention will become apparent from the drawings, the specification and the claims.

The accompanying drawing is a schematic illustration of the preferred form of auxiliary electrical generating system in accordance with the present invention.

A jet engine indicated generally at 10 has a compressor section 11 therein for producing compressed air to be mixed with the fuel and burned. A portion of the compressed air produced may be withdrawn, as through port or ports 12, and used elsewhere in the aircraft. One common use of this compressed air, or bleed air, withdrawn from the engine is for maintaining adequate cabin pressure during high-altitude flights. A manifolding system is therefore generally provided in large jet aircraft for receiving and distributing bleed air from all the jet engines. In the drawing, only a single engine is shown; however, it is to be understood that the bleed air used in the present system may be obtained from any one or more of the jet engines, or from a manifolding system connected to all the jet engines.

The bleed air, after being withdrawn from jet engine 10, or from the manifolding system, is preferably passed through a pressure regulator 14 so that air is supplied to the system at a relatively constant rate and pressure. The air then flows through check valve 16 which prevents back flow through conduit means indicated at 18 and 20 to governor valve 36 which regulates the flow of air to the turbine as hereinafter explained. From governor valve 36 air flows through conduit 22 to a pneumatic turbine 24. The bleed air flowing across the turbine 24 from a high pressure to a low pressure area rotates the turbine at a high rate of speed. This rotational motion is transmitted through shaft 26 and speed reducer 28 to shaft 30, which in turn drives an electrical generator 32. Since most of the electrical instruments aboard modern jet aircraft are adapted for alternating current, generator 32 is preferably a three-phase AC generator. The output current from generator 32 may then be used to power any desired emergency appliances or instruments aboard the aircraft, or may be used solely for illuminating and powering a gyroscopic attitude indicator pursuant to Federal Aviation Regulation 121.305(j).

Governor means for controlling the speed of generator 32 is preferably provided by governor valve 36, which is adapted to sense changes in the AC frequency or voltage output from generator 32 over feedback line 38, and to increase or decrease the flow of air to turbine 24 in response thereto. Alternatively, suitable mechanical governor means could be provided between the turbine 24 and the AC generator 32.

An ancillary compressed gas source is also included in the preferred form of the system to provide for continued operation even in the unlikely event of a loss of power in all the jet engines supplying the bleed air. The ancillary gas source may be of any convenient type such as a gas generator or powder cartridges, but is preferably in the form of a flask 40 containing any suitable compressed gas. The flask 40 is connected through pressure regulator valve 42, conduit 44 and check valve 46 to conduit 20 so that when the flask is open its gas supply will take the place of the absent bleed air and continue to operate the turbine 24. The period of extended operation depends on the volume and pressure of the gas in flask 40.

A valve 48 on flask 40 contains means normally blocking the flow of gas from flask 40 into the system and means for automatically opening the blocking means to permit flow from the flask whenever the normal flow of bleed air from the jet engine 10 is interrupted. The blocking means may conveniently be in the form of a rupturable metal disc, and the opening means may conveniently be in the form of an explosive charge or squib which will detonate in response to an interruption in the normal supply of bleed air and open the seal, thereby permitting flow of gas from the flask 40 into the generating system. Electrical current from the generator 32 may be used as a means for sensing the interruption of normal bleed air and for detonating the squib and opening flask 40 as follows: A line 50 transmits current from output to the squib in valve 48. Two switches 52 and 54 are present in line 50. When both switches are closed, current from the generator 32 will detonate the squib and open the flask. When either of the switches is open, no detonation will take place. The first switch 52 is a low-voltage actuated relay. So long as voltage output from the generator remains at an acceptable level, indicating that the turbine 24 is receiving an adequate supply of bleed air, the switch 52 will remain open. However, when the flow of bleed air to the turbine 24 is interrupted, the turbine and generator will begin slowing down and the voltage output from generator 32 will begin to drop or "decay." The turbine and generator, due to inertia, will not stop immediately after interruption of bleed air and therefore the generator, although decaying, will still be generating sufficient voltage to detonate the squib. When the voltage output from generator 32 drops below a predetermined trip point, relay switch 52 will close. However, since this sequence of events will occur each time the jet lands and shuts down its engines, as well as during an emergency situation, a second switch 54 is provided in line 50 which will be moved whenever the jet is on the ground and reversed whenever it is airborne, thereby permitting detonation of the squib if the voltage from generator 32 decays during flight, but preventing it on the ground.

The operation of switch 54 is controlled by a so-called "squat switch" 56 in strut 58 on one or more of the aircraft's landing gear. Squat switches, which are in regular use in commercial aircraft, sense the on-ground or off-ground status of the aircraft through compression or lack of compression in the strut 58 due to weight of the aircraft on said gear. The squat switches normally activate two electrical buses indicated at 60 and 62 which are powered by the aircraft's normal electrical system indicated at 64. Bus 60 is energized whenever squat switch 56 indicates that the aircraft is on the ground, whereas bus 62 is energized whenever the squat switch indicates that the aircraft is airborne. Thus, switch 54 may conveniently be moved between open and closed positions responsive to the aircraft's position by means of solenoids 66 and 68 operated from buses 60 and 62. Solenoid 66 is connected through line 70 to bus 60 and will therefore be energized to open switch 54 whenever the aircraft is on the ground. Solenoid 68 is connected through line 72 to bus 62 and will therefore be energized to close switch 54 when the aircraft is airborne. Switch 54 is moved between open and closed positions only in response to activation of solenoids 66 and 68. Therefore, once the plane is off the ground and switch 54 is closed, it will remain closed even though the aircraft's normal electrical system fails.

The method and sequence of operation of the system during a flight is as follows: (1) The aircraft is on the ground and the engines have not been started. Low voltage relay 52 in line 50 is closed, but switch 54 is opened since the aircraft is on the ground. (2) The engines are started and the bleed air begins to rotate turbine 24. Voltage output from generator 32 climbs to the desired level and low voltage switch 52 opens. The emergency instruments, such as the attitude gyro, which are operated by the output of generator 32 begin operation, notifying the pilot that the auxiliary generating system is working. (3) The aircraft takes off and squat switch 56 energizes bus 62 and solenoid 68, moving switch 54 to its closed position. Now, so long as the jet engines continue operating, the auxiliary generating system will continue to supply current to its instruments regardless of the failure of the aricraft's normal electrical system. (4) If during flight the normal supply of bleed air to turbine 24 is interrupted, as by failure of all the engines contributing bleed air to the system, then generator 32 will begin slowing down and its voltage output will drop. Relay switch 52 will sense the decay in voltage and will close. Since the aircraft is airborne, switch 54 is already closed, and thus the circuit to the explosive squib in valve 48 is completed. The squib will detonate, rupturing the metal disc in valve 48 and permitting the flow of gas from flask 40 into conduit 44, conduit 20, governor valve 36, conduit 22, and then to turbine 24. Gas from flask 40 will continue to operate the system until exhausted. Hopefully, before the gas from flask 40 will have been expended, the pilot will have managed to re-ignite at least one of his engines so that an adequate supply of bleed air will have been resumed and the system will continue to operate. (5) Assuming a normal flight with no interruption of bleed air, and no failure of the electrical system, the plane will descent and land. As soon as the landing gear touches ground and struts are compressed, squat switch 56 will energize bus 60 and solenoid 66 to open switch 54. When, as the pilot shuts down the engines and the output of generator 32 drops, low-voltage relay 52 will close, but the circuit will not be completed and the explosive squib in valve 48 will not be detonated.

The foregoing disclosure and description of the invention are illustrative and explanatory thereof, and various changes in the size, shape and materials, as well as in the details of the illustrated construction, may be made within the scope of the appended claims without departing from the spirit of the invention.

What is claimed is:

1. An auxiliary electrical power generating system for jet aircraft comprising:
   a jet engine,
   means for obtaining compressed gas from said jet engine,
   conduit means for conducting said compressed gas from said jet engine to a pneumatic turbine,
   an ancillary compressed gas source,
   conduit means for conducting compressed gas from said ancillary gas source to said pneumatic turbine,
   said turbine being rotated by compressed gas from one of said jet engines and said auxiliary gas source flowing across said turbine from a high pressure area to a low pressure area,
   blocking means normally preventing the flow of gas from said auxiliary gas source to said turbine when said engine is operating,
   means for automatically opening said blocking means to permit said flow if said engine should fail,
   an electrical generator adapted to be driven by said turbine, and
   means for transmitting the electrical power generated to one or more electrical appliances aboard the aircraft.

2. The system of claim 1 wherein said means for automatically opening said block means includes a switch responsive to output from said generator and a switch responsive to the on-ground or off-ground status of said aircraft.

3. The system of claim 1 wherein the power from said generator is used for illuminating and powering an attitude indicator.

* * * * *

UNITED STATES PATENT OFFICE
CERTIFICATE OF CORRECTION

Patent No. 3,662,975                 Dated May 16, 1972

Inventor(s) Driskill, Robert E.

It is certified that error appears in the above-identified patent and that said Letters Patent are hereby corrected as shown below:

[72] Inventor: ROBERT E. DRISKILL, 4702 Highland Terrace, Austin, Tex. 78731

Signed and sealed this 17th day of October 1972.

(SEAL)
Attest:

EDWARD M. FLETCHER, JR.
Attesting Officer

ROBERT GOTTSCHALK
Commissioner of Patents